April 14, 1942.   J. ROSHEIM   2,279,527
SELF-CLOSING GATE OR THE LIKE
Filed Sept. 17, 1940   2 Sheets-Sheet 1
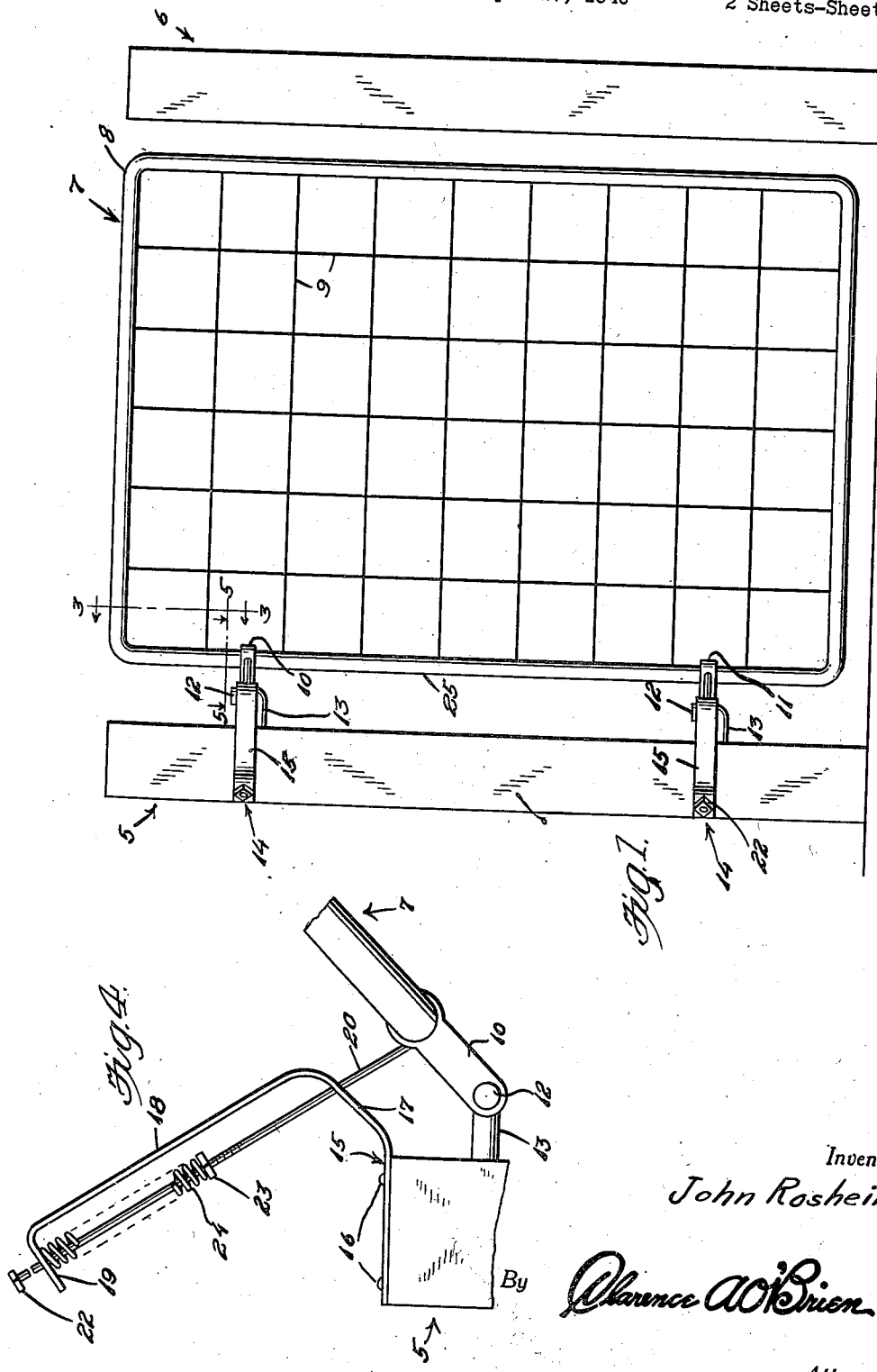
Inventor
John Rosheim
By Clarence A. O'Brien
Attorney

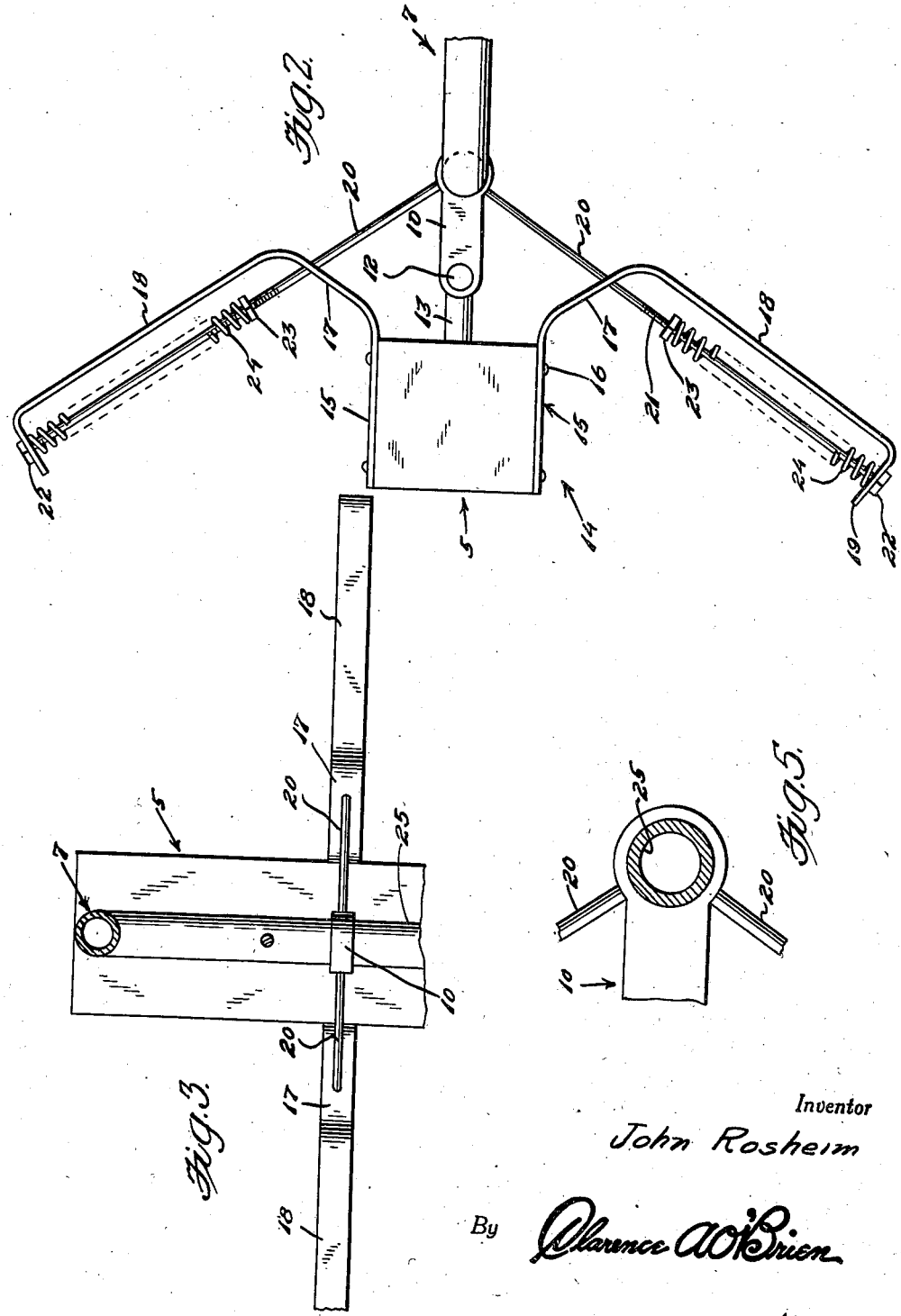

Patented Apr. 14, 1942

2,279,527

UNITED STATES PATENT OFFICE 2,279,527

SELF-CLOSING GATE OR THE LIKE

John Rosheim, Scarville, Iowa

Application September 17, 1940, Serial No. 357,174

2 Claims. (Cl. 16—72)

My invention relates to improvements in self-closing gates or the like, and the primary object of my invention is to provide a gate of this character which is easily opened from either side by manual pressure thereon and which will automatically swing back to the closed position upon release of the pressure on the gate.

Another important object of my invention is to provide adjustable spring buffer means for mounting on the opposite sides of the mounting post of a swingable gate or the like, having means engageable with the opposite sides of the gate or the like in accordance with the position of the gate, for automatically returning the gate toward closed position and maintaining the same in a closed position until a predetermined pressure on the gate or the like is exerted at a point remote from the pivotal mounting thereof to effect opening swinging of the gate, the said means featuring simplicity and low cost in construction.

Other important objects and advantages of my invention will be apparent from a reading of the following description taken in connection with the drawings, wherein for purposes of illustration I have shown a preferred embodiment of my invention.

In the drawings:

Figure 1 is a general side elevational view of a self-closing gate in accordance with the present invention.

Figure 2 is an enlarged fragmentary top plan view of Figure 1.

Figure 3 is a fragmentary transverse vertical sectional view taken through Figure 1 along the line 3—3 and looking toward the left in the direction of the arrow.

Figure 4 is a fragmentary view similar to Figure 2 but showing the gate swung in an open position, whereas Figure 2 shows the gate in the closed position.

Figure 5 is a fragmentary enlarged horizontal sectional view taken on the line 5—5 through Figure 1 and looking downwardly in the direction of the arrow.

Referring in detail to the drawings, in which is shown for illustrative purposes only, what is generally known as a lawn gate, the numerals 5 and 6 designate spaced posts between which the gate 7 is mounted, the gate being of the well known rectangular frame construction as indicated by the numeral 8 with crossed wires 9 forming the web of the gate, and with horizontal gate hinge members 10 and 11, respectively, of any suitable type, secured to the vertical side rail of the gate at vertically spaced intervals, in a well known manner, with the openings in the outer ends thereof rotatably receiving the hinge pin portions 12 projecting upwardly from the hinge bolts 13 which are anchored in the post 5. The foregoing construction is substantially conventional and does not constitute essence of the invention.

Positioned substantially on a level with each of the arms 10 and 11 is a corresponding pair of adjustable spring buffers 14, each of which consists of a strap iron bar 15 secured as indicated by the numeral 16 to the corresponding side of the gate post 5 as indicated in Figure 2, and having a laterally directed portion 17 deflected at an obtuse angle and terminating in a straight portion 18 which extends at an acute angle to the bar 15 and has on its free end a right angular portion 19. The portion 17 has a hole therein through which slides the plunger rod 20 which is smooth at that point but is screw-threaded as indicated by the numeral 21 toward the laterally outward end thereof. The laterally outward end or terminal of the rod 20 has threaded thereon a nut 22 on the outer side of the portion 19 through which the rod extends, and the rod portion 21 has another nut 23 spaced from the portion 19 and adjustable to compress between the nut 23 and the portion 19 a helical spring 24 which is circumposed on this portion of the rod. The unthreaded portion of the rod 20 extends in a laterally inward direction at an acute angle with respect to the plane which passes through the gate 7 in its closed position, with the laterally inward terminal of the rod engaging the gate frame member 25, or more properly the adjacent side of that portion of the corresponding one of the arms 10 and 11 which embraces this gate frame member 25. With a similarly constructed buffer arrangement on the opposite side of the post 5 and with the tension of the spring 24 properly adjusted by manipulation of the nut 23, the gate 7 will be held in a closed position until sufficient pressure is exerted on one side or the other thereof to swing the same to an open position against the tension of the spring 24 on that side. Then when the gate is released, the spring thus tensioned will act upon its rod 20 and push against the frame member 25 of the gate and restore the gate toward closed position, in which the gate is arrested by the resistance offered by the opposing buffer arrangement. The nut 22 may be used to adjust the extension of